United States Patent [19]

Masumoto

[11] Patent Number: 5,018,010
[45] Date of Patent: May 21, 1991

[54] DECODER FOR SUBSAMPLED VIDEO SIGNAL

[75] Inventor: Takahiko Masumoto, Osaka, Japan

[73] Assignee: Sanyo Electric Co., Ltd., Moriguchi, Japan

[21] Appl. No.: 476,069

[22] Filed: Feb. 1, 1990

[30] Foreign Application Priority Data

Feb. 3, 1989 [JP] Japan .................. 1-26303

[51] Int. Cl.⁵ ........................................ H04N 7/12
[52] U.S. Cl. .................................. 358/136; 358/36; 358/105; 358/138; 358/167
[58] Field of Search .................. 358/136, 138, 105, 36, 358/167

[56] References Cited

U.S. PATENT DOCUMENTS

| | | | |
|---|---|---|---|
| 4,692,801 | 9/1987 | Ninomiya et al. | 358/133 |
| 4,873,573 | 10/1989 | Thomas | 358/138 |
| 4,942,466 | 7/1990 | Sandbank | 358/138 |
| 4,954,894 | 9/1990 | Kitaura | 358/167 |

FOREIGN PATENT DOCUMENTS 62-53081 3/1987 Japan .

OTHER PUBLICATIONS

"MUSE: Transmission System of High Vision Broadcast Via Satellite", Nikkei Electronics, Nov. 2, 1987, pp. 189-212.

Primary Examiner—Howard W. Britton
Attorney, Agent, or Firm—Armstrong, Nikaido, Marmelstein, Kubovcik & Murray

[57] ABSTRACT

Disclosed is a MUSE decoder for a pixel signal sampled in accordance with Multiple Sub-nyquist Sampling Encoding (MUSE). An interframe interpolation circuit (142) applies a pixel signal Sg which is not subjected to noise reduction processing to an intrafield interpolation circuit (18') for motion picture processing through a signal line (L5). A pixel signal delayed, which is outputted from delay circuits (24a, 24b) is subjected to a required noise reduction processing by an adder 60. Since the intrafield interpolation circuit 18' receives the pixel signal Sg which is not subjected to the noise reduction processing, an adverse influence on a motion picture, which may be caused by the noise reduction, is prevented even in case that the delay circuits (24a, 24b) are shared for motion picture processing and still picture processing.

15 Claims, 11 Drawing Sheets

DECODER FOR SUBSAMPLED VIDEO SIGNAL

BACKGROUND OF THE INVENTION

1. Field of the Invention

The present invention relates generally to decoders for subsampled video signals, and more particularly to a decoder for a subsampled video signal which is band compressed by the interframe offset subsampling. This invention has particular applicability to a MUSE decoder for a video signal which is band compressed based on Multiple Sub-nyquist Sampling Encoding (hereinafter referred to as MUSE) More specifically, this invention relates to an improvement in an interframe interpolation circuit for decoding a still picture signal, provided in the MUSE decoder.

2. Description of the Background Art

Various television broadcastings for transmitting high-quality video have been proposed in recent years. Nippon Hoso Kyokai (NHK) in Japan has proposed a high-definition television system called high vision. According to the standard of this high vision, the number of scanning lines is 1125, a field frequency is 60 Hz, an interlace ratio is 2:1, and a length-to-breadth ratio of a picture is 9:16. A baseband signal of this high vision signal has a bandwidth of 22 MHz for a luminance signal and 7 MHz for each of two color difference signals (R-Y, B-Y).

Since the high vision signal includes signal components of a wide band, it cannot be transmitted as it is by using a bandwidth (27 MHz) on one channel of an usual satellite broadcasting. Therefore, NHK has proposed a band compressed transmission system for converting the high vision signal into an 8 MHz signal. This band compressed transmission system is called Multiple Sub-nyquist Sampling Encoding (MUSE system). An application of this MUSE system enables the bandwidth of the high vision signal to be compressed to 8 MHz and thus be transmitted on one channel band of the satellite broadcasting. A general description concerning the MUSE system is disclosed, for example, in U.S. Pat. No. 4,692,801 assigned to Ninomiya et al on Sept. 8, 1987. In addition, another description with the MUSE system is found in an article entitled "MUSE: Transmission System of High Vision Broadcast via Satellite" in Nikkei Electronics, Nov. 2, 1987, pp. 189–212. As described in those articles, it is noticed that the MUSE system is a band compression technology employing correlation properties of a video signal.

Figure 1:
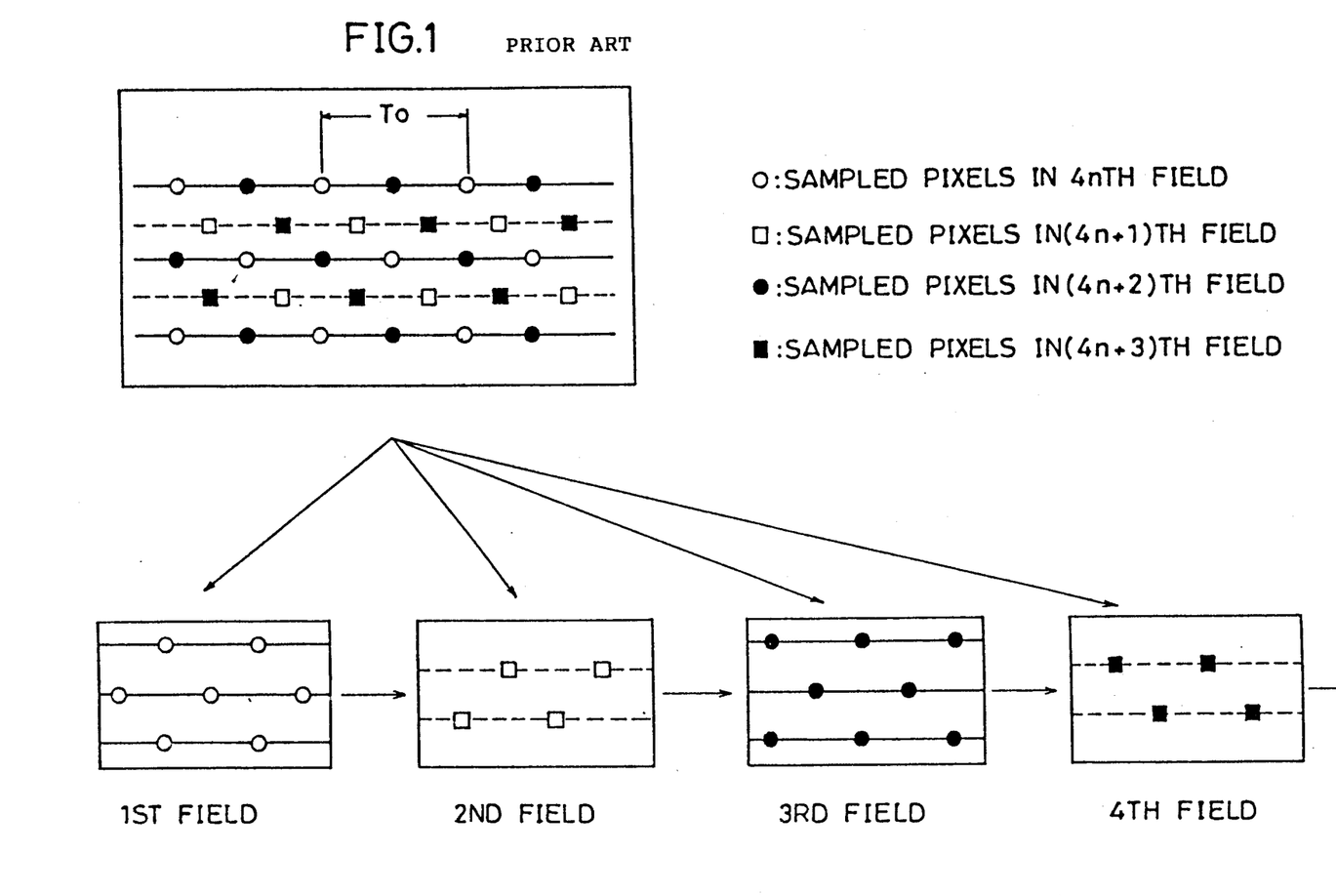
FIG. 1 is a sampling diagram showing sampling points of pixels to be sampled based on a MUSE system.

FIG. 1 shows sampling points of the high vision signal and those points in each field thereof. In this figure, marks of a hollow circle (◯), a hollow square (▢), a solid circle ● and a solid square ▪ represent sampling points in the 4n−th, the (4n+1)−th, the (4n+2)−th and the (4n+3)−th fields, respectively. $T_0$ represents a sampling interval, which corresponds to the reciprocal of a transmission sampling rate (16.2 MHz). In sampling the high vision signal, a sampling phase is offset between any fields, between any frames and between any lines so that the sampling points do not overlap one another between fields, between frames and between lines. That is, the sampling phase is controlled so as to be circulated every four fields, so that a MUSE signal is generated by sampling of the high vision signal.

A MUSE decoder for decoding this MUSE signal to the original high vision signal carries out different processings for a signal in a still picture portion and a signal in a motion picture portion.

In the processing of the still picture portion, since a picture has a correlation between any fields and between any frames, a pixel which drops out between any pixels being transmitted at present is interpolated based on a pixel one field before, a pixel one frame before and a pixel three fields before. That is, a video in the still picture portion is reproduced based on the MUSE signal to be inputted during the four-field period.

Meanwhile, in processing of the signal in the motion picture portion, there exists no correlation with time, i.e., no correlation between any fields and between any frames. Thus, a reproduction is carried out only with pixel data at a sampling point in the field, which is being transmitted at present. In addition, the pixel dropping out between the pixels being transmitted at present is interpolated utilizing a correlation between lines, namely, pixels on at least the upper and lower lines.

Figure 2:
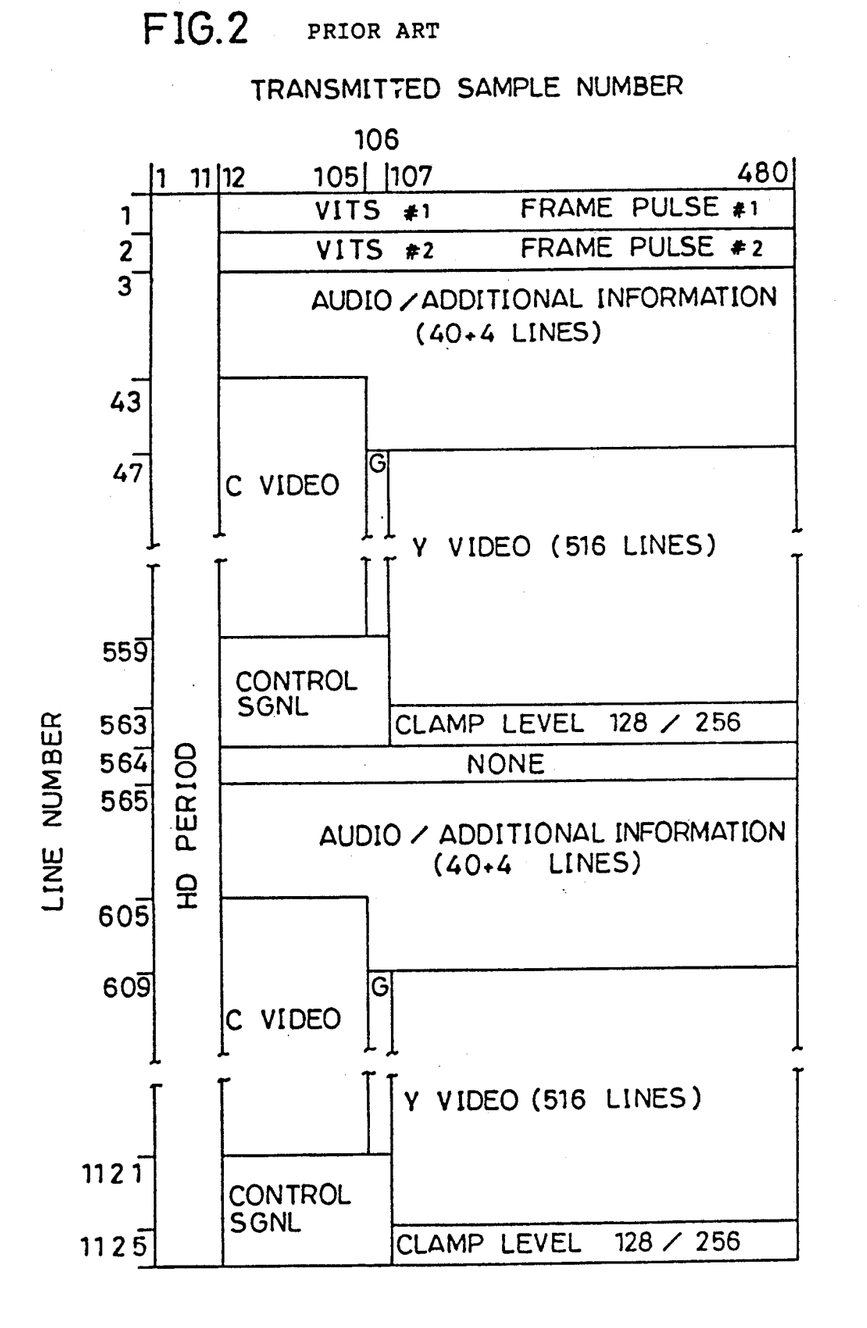
FIG. 2 is a format diagram showing a format of a transmission signal based on the MUSE system.

The signal processing in the conventional MUSE decoder as described above will now be described with reference to FIGS. 2 and 3. FIG. 2 shows a MUSE signal transmission system, and FIG. 3 is a schematic diagram of the MUSE decoder, which is simplified to facilitate the description thereof.

Figure 3:
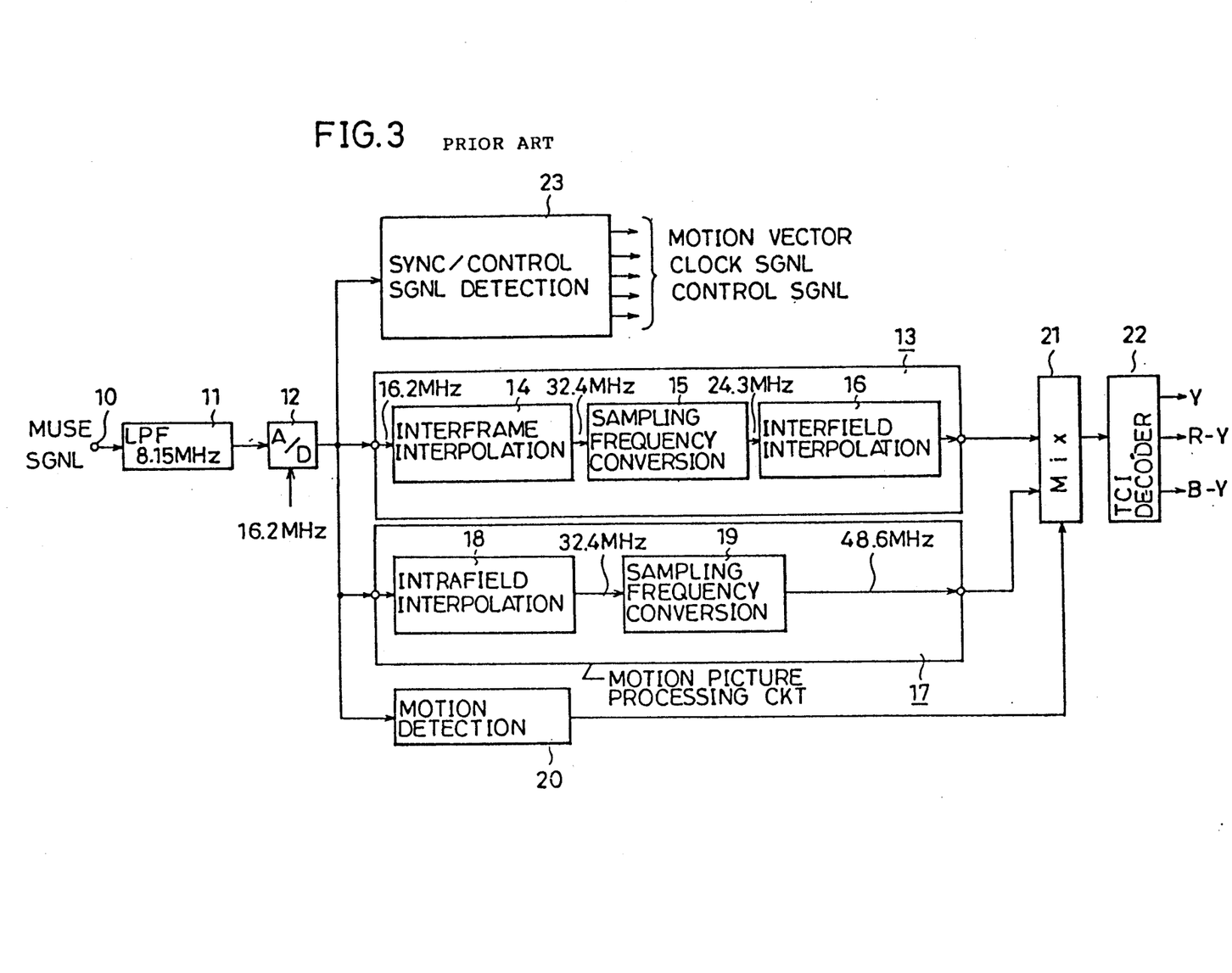
FIG. 3 is a schematic block diagram of a conventional MUSE decoder.

Referring to FIG. 3, the MUSE decoder comprises a MUSE signal input terminal 10, an 8.15 MHz low-pass filter 11, an A/D converter 12 for sampling pixel data in response to a clock signal of 16.2 MHz, a still picture processing circuit 13, a motion picture processing circuit 17, a motion detecting circuit 20, a mixing circuit 21, a TCI decoder 22 and a synchronization/control signal detection circuit 23. The still picture processing circuit 13 comprises an interframe interpolation circuit 14, a sampling frequency converting circuit 15, and an interfield interpolation circuit 16. The motion picture processing circuit 17 comprises an intrafield interpolation circuit 18 and a sampling frequency converting circuit 19.

The mixing circuit 21 mixes a signal from the still picture processing circuit 13 and a signal from the motion picture processing circuit 17. A mixing ratio thereof varies depending on the amount of motion of a video detected by the motion detection circuit 20. A high vision signal is outputted through the TCI decoder 21. The synchronization/control signal detection circuit 23 carries out (a) detecting a horizontal/vertical synchronizing signal, (b) generating clock signals with various frequencies (16.2 MHz, 32.4 MHz, 48.6 MHz and the like), (c) detecting control signals having motion vector data or the like shown in Table 1 in the following, and (d) generating a control signal and a clock signal of each circuit based on the detection of those control signals.

TABLE 1

| BIT NO. | CONTENT OF CONTROL | |
|---|---|---|
| 1 | Interfield subsampling phase (Y) | (1: when sampling points are on the right) |
| 2 | Horizontal motion vector (2') | (Positive: when the picture shifts to the right) |
| 3 | #2, LSB | |
| 4 | ICK unit of 32 MHz | |
| 5 | | |
| 6 | Vertical motion vector (2') | (Positive: when the picture shifts downwards) |
| 7 | #6, LSB | |
| 8 | Line unit | |
| 9 | Y subsampling phase | (1: when sampling points are on the right on odd |

TABLE 1-continued

| BIT NO. | CONTENT OF CONTROL | |
| --- | --- | --- |
| 10 | C sampling phase | number lines) (1: when the value of line #2 (fraction is discarded) is an odd number and sampling points are on the left) |
| 11 | Noise reduction is carried out in response to the | |
| 12 | value of noise reduction control | |
| 13 | Interlace flag | |
| 14 | Motion detection sensitivity control (1) | (1: when the lower sensitivity is selected) |
| 15 | Motion detection sensitivity control (2) | |
| 16 | | 0: normal |
| 17 | Motion information | 1: completely still picture 2: not completely still picture |
| 18 | | 3~7: the degree of motion |
| 19 | None | |
| 20 | AM/FM | (1: AM, no emphasis) |
| 21~32 | Spare | |

After the MUSE signal inputted is converted to digital data by the A/D converter 12, the still picture processing circuit 13 and the motion picture processing circuit 17 carry out decoding for a still picture and a motion picture, respectively. Output signals from these circuits 13 and 17 are mixed together at the mixing circuit 21 depending on the amount of motion detected by the motion detection circuit 20. An output signal of this mixing circuit 21 is applied to the TCI decoder 22, so that the TCI decoder 22 outputs a high vision signal.

Figure 4:
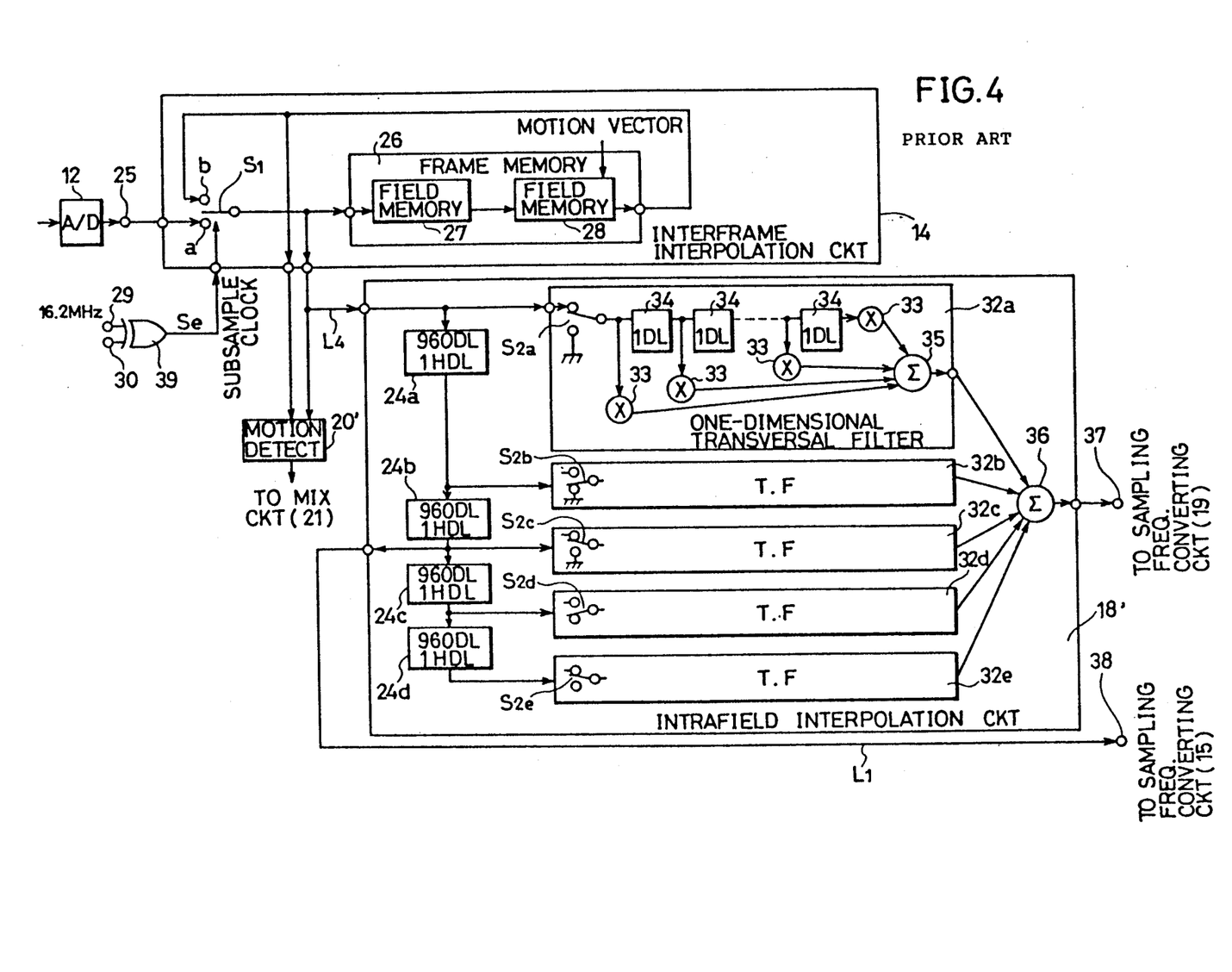
FIG. 4 is a block diagram showing a conventional interframe interpolation circuit and a conventional intrafield interpolation circuit.

FIG. 4 shows one example of the interframe interpolation circuit 14 and the intrafield interpolation circuit 18 in the conventional MUSE decoder. In this example, the processing at the intrafield interpolation circuit 18 is time-consuming. Therefore, in order to correct a large deviation between the timings of signals in the still picture processing circuit 13 and the motion picture processing circuit 17, an output signal of the interframe interpolation circuit 14 is delayed through one-line memories 24a and 24b in the intrafield interpolation circuit 18, so that a signal, the timing of which is controlled by this delay, is outputted to the sampling frequency converting circuit 15.

Figure 5:
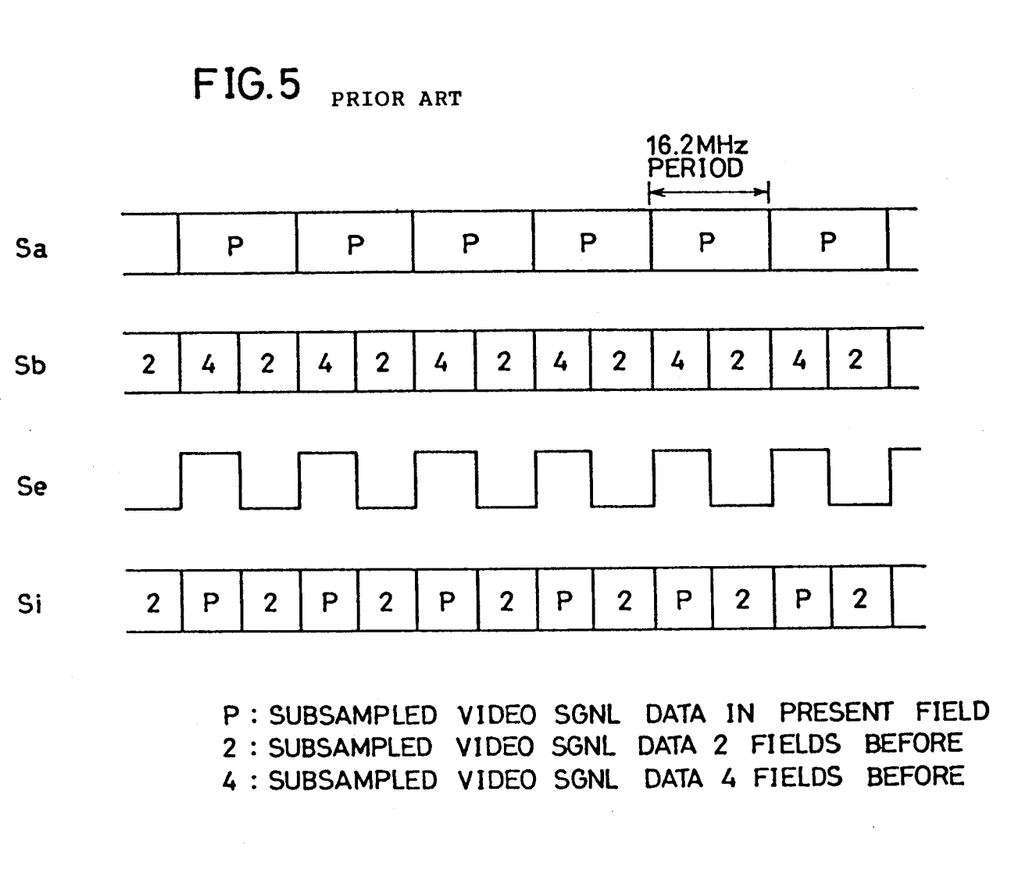
FIG. 5 is a signal processing diagram for describing an operation of the interframe interpolation circuit shown in FIG. 4.

Referring to FIG. 4, a pixel signal Sa in the present field as shown in FIG. 5 is inputted into a terminal a of a switch S1 for interframe interpolation. (Each pixel signal in the present field is denoted with "P" in the following description and the following figures). Meanwhile, a signal Sb in which pixel signals 4 two frames before are interpolated between pixel signals 2 one frame before as shown in FIG. 5, is inputted into the other terminal b of the switch S1. The switch S1 operates responsive to an output signal (subsampling clock) Se from an EXOR circuit 39 to output a signal Sc in which the pixel signals P included in the signal Sa are interpolated between the pixel signals 2 one frame before in place of the pixel signals 4 two frames before. A frame memory 26 for delaying the input signal Sc by approximately one frame period is provided in the interframe interpolation circuit 14. The frame memory 26 comprises field memories 27 and 28 each constituting one field delay circuit. This one-field memory 28 has its delay time controlled responsive to a motion vector signal in order to correct a motion vector.

A motion detecting circuit 20' receives the respective signals in the present frame, one frame before and two frames before. As mentioned above, since the sampling points of the MUSE signal are circulated every two frames (four fields), the motion detecting circuit 20' detects a motion by comparing the pixel signals in the present frame and those two frames before (the detection of the difference in motion between every two frames). Since the motion detection is incomplete only by detecting the difference between every two frames, the detection circuit 20' also detects a motion by comparing the pixel signals in the present frame with those one frame before. This motion detection between any frame is carried out by comparing signal components equal to or less than 4.2 MHz, which have no folding distortion generated by subsampling in the still picture. The signals, which represent the amount of motion detected by these two motion detecting operations, are applied to the mixing circuit 21, and the mixing ratio is controlled as described above.

The clock signal of 16.2 MHz is applied to the EXOR circuit 39 through an input terminal 29. A phase control signal for interpolating the pixel signals in the present frame in place of the pixel signals two frames before by the switch S1 is applied to the EXOR circuit 39 through the other terminal 30. This phase control signal is generated in the synchronization/control signal detecting circuit 23 in response to 9th bit data in a control signal and a horizontal/vertical synchronizing signal.

As is known, the intrafield interpolation circuit 18' of the MUSE decoder produces pixels dropping out between the transmitted pixels by filtering, and also filters the transmitted pixels, resulting in an enhancement in the degree of freedom in a frequency characteristic of a video signal. This intrafield interpolation circuit 18' comprises line memories 24a, 24b, 24c and 24d for one horizontal scanning period (1H) delay, switches S2a, S2b, S2c, S2d and S2e for selecting the pixel signals in the present frame and inserting a ground signal (0 signal) in place of the pixel signals one frame before, and one-dimensional transversal filters 32a, 32b, 32c, 32d and 32e. These one-dimensional transversal filters 32a-32e are identical in their configurations, but different from one another only in their tap coefficients to be set. The transversal filter 32a comprises delay elements 34 for delaying by a time period corresponding to one pixel. Each of these unit delay elements 34 is constituted by a D type flip-flop (D-FF). Multipliers 33 are provided in the transversal filter 32a. The multipliers 33, each constituted by a ROM in general, multiply signals delayed by the delay elements 34 by the respective tap coefficients different from one another. An adder 36 is connected to respective output of the transversal filters 3a-32e. A signal, the result of the addition by the adder 36, is outputted through a terminal 37 to the sampling frequency converting circuit 19 for motion picture signal processing.

Figure 6:
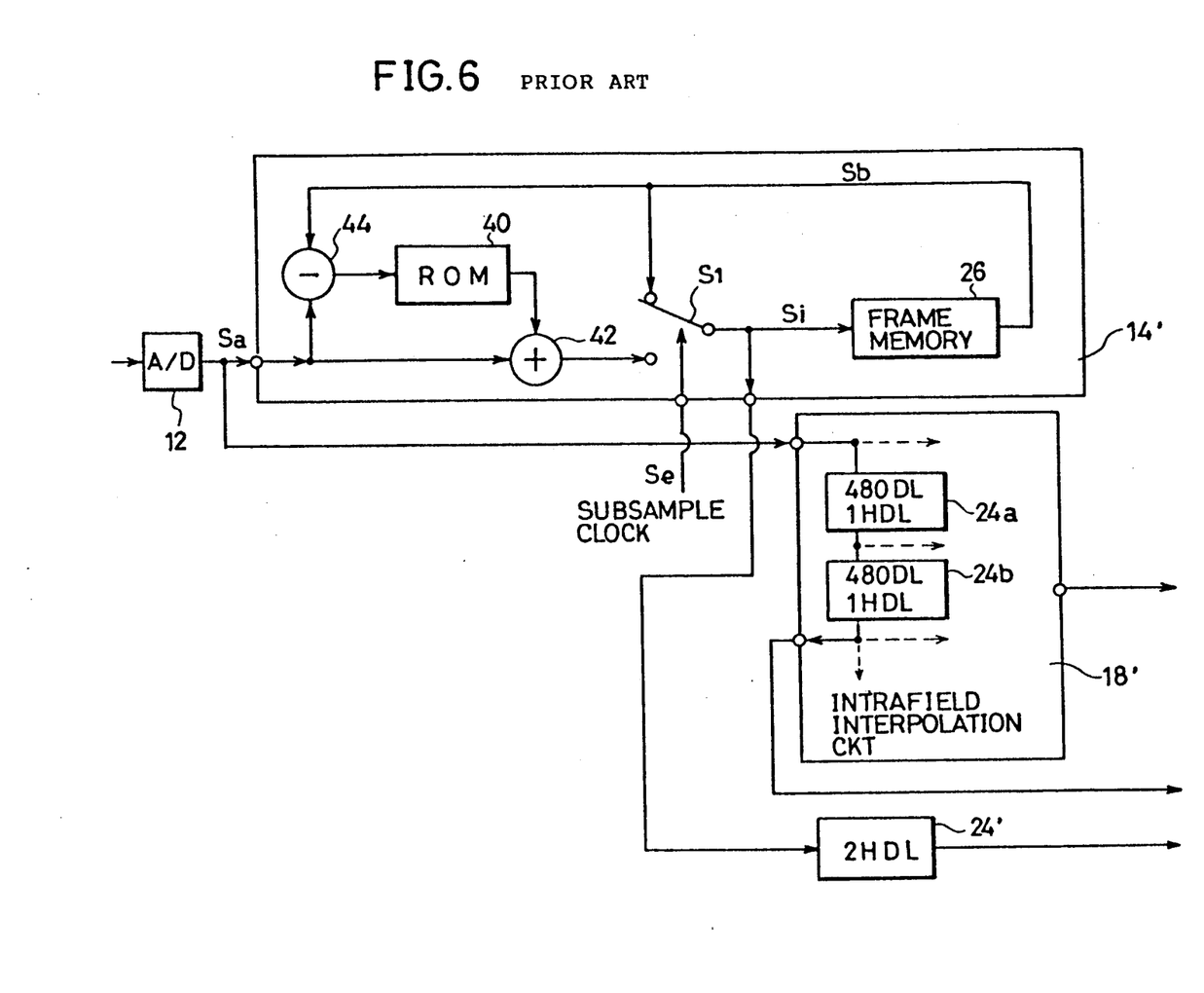
FIG. 6 is a block diagram showing another conventional interframe interpolation circuit.

A recursive noise reduction circuit has conventionally been well known as a noise reduction circuit. When this recursive noise reducer is employed in the MUSE decoder, sampling points of the MUSE signal coincide with one another every four fields (two frames), and hence a recursive noise reduction with interframe correlation is carried out. The noise reduction circuit provided in the interframe interpolation circuit 14' uses a frame memory 26 for the interframe interpolation circuit 14' as a 2-frame delay element, as shown in FIG. 6. Referring to FIG. 6, the noise reduction circuit provided in the interframe interpolation circuit 14' comprises a subtracter 44 for detecting a difference signal between two frames, a ROM (Read Only Memory) 40 for multiplying a coefficient, and an adder 42 for noise reduction. The ROM 40 outputs a signal for reducing noise.

The noise reduction can be carried out basically only when the correlation exists between the frames. Therefore, the recursive noise reduction circuit between two frames is employed only for the still picture signal processing, as is already known. In the conventional circuit shown in FIG. 4, however, an output signal subjected to the noise reduction is applied through a signal line L4 to the intrafield interpolation circuit 18' for motion picture processing. This causes an influence of the noise reduction to be exerted on a motion picture, which is not preferable. In order to reduce this influence, an effect due to the recursive noise reduction is determined smaller in the conventional circuit shown in FIG. 4. As another counter-measure substituting for the determination of this smaller effect, a dedicated delay circuit 24' is separately provided for delaying an output signal of the interframe interpolation circuit 14', as shown in FIG. 6. Consequently, delay circuits 24a and 24b in the intrafield interpolation circuit 18' need not be used, and hence the noise reduction does not affect the motion picture. However, an additional delay circuit 24' is required instead, leading to an increase in the occupied area on a semiconductor chip.

The related art of interest to the present invention is disclosed in Japanese Patent Laying-Open No. 62-53081, entitled "MUSE System Television Receiver". This related art is considerably different from the present invention in its circuit configuration, but discloses a noise reducer based on the MUSE system.

SUMMARY OF THE INVENTION

It is an object of the present invention to prevent a degradation in picture quality of a motion picture, caused by an interframe interpolation device.

It is another object of the present invention to prevent a degradation in picture quality of a motion picture, caused by an interframe interpolation device, without increasing an occupied area on a semiconductor substrate.

It is a further object of the present invention to prevent an adverse influence on a motion picture, caused by a noise reduction, in an interframe interpolation device.

It is a still further object of the present invention to use a delay circuit for motion picture processing without exerting an adverse influence on a motion picture, in an interframe interpolation device.

It is still another object of the present invention to apply a pixel signal before subjected to a noise reduction to a delay circuit for motion picture processing, in an interframe interpolation device.

Briefly, the interframe interpolation device according to the present invention comprises a holding circuit for holding a subsampled pixel signal for two frames period, an interpolation circuit for interpolating a pixel signal held in a previous frame between pixel signals in the present frame, a first noise reduction circuit for carrying out a noise reduction for the pixel signals in the present frame in response to the pixel signals in the present frame and those in the two frames before, an applying circuit for applying pixel signals which are not processed by the first reduction circuit to a delay circuit for motion picture processing, and a second noise reduction circuit for carrying out the noise reduction for pixel signals outputted from the delay circuit in response to the pixel signals in the present frame and those in the two frames before.

In operation, pixel signals which are not subject to the noise reduction are applied to the delay circuit for motion picture processing, preventing a degradation in picture quality of a motion picture, caused by the noise reduction.

According to a preferred embodiment, the present invention is applied to the interframe interpolation circuit provided in a MUSE decoder. Even if this interframe interpolation circuit employs a delay circuit provided in an intrafield interpolation circuit for motion picture processing, an adverse influence on a motion picture is prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 7:
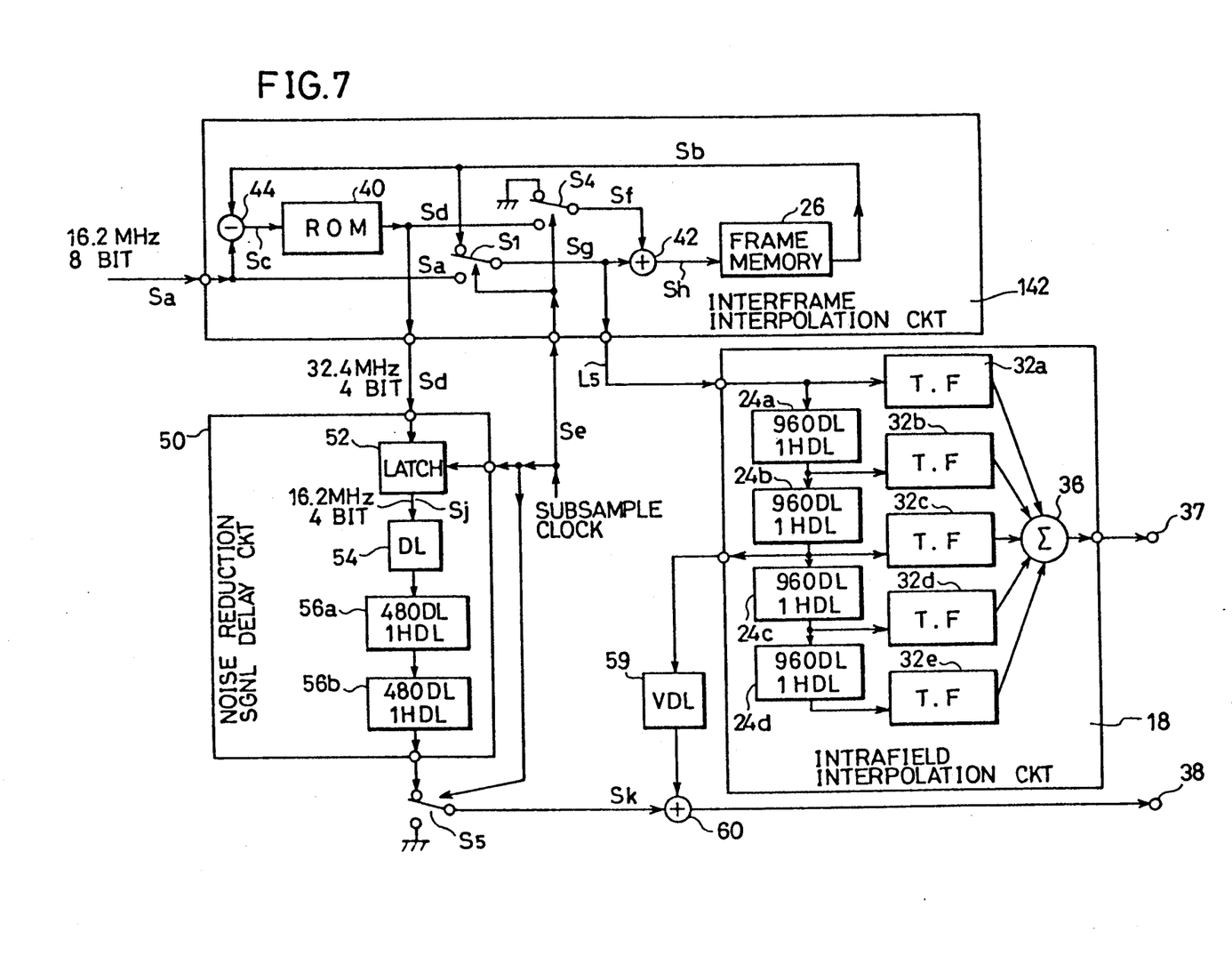
FIG. 7 is a block diagram of an interframe interpolation circuit showing a first embodiment of the present invention.

A circuit for interframe interpolation will now be described as the first embodiment of the present invention with reference to FIGS. 7 and 8. An adder 42 for reducing noise is connected to an output of a switch S1. A frame memory 26 for one-frame delay is connected to an output of the adder 42. It should be noted that an output signal of the switch S1, i.e, a signal Sg before subjected to noise reduction is applied to an intrafield interpolation circuit 18' for motion picture processing through a signal line L5. A signal delayed by delay circuits 24a and 24b in the circuit 18' is applied to an adder 60 via a variable delay circuit 59, so that this adder 60 carries out an addition for noise reduction processing. That is, since the signal Sg which is not subjected to the noise reduction is delayed by the delay circuits 24a and 24b, the delayed signal undergoes required noise reduction processing. Therefore, switches S4 and S5 have the same function, and the adders 42 and 60 have the same function. A noise reduction signal delay circuit 50 is provided for a timing control required for the noise reduction by the adder 60.

Figure 8:
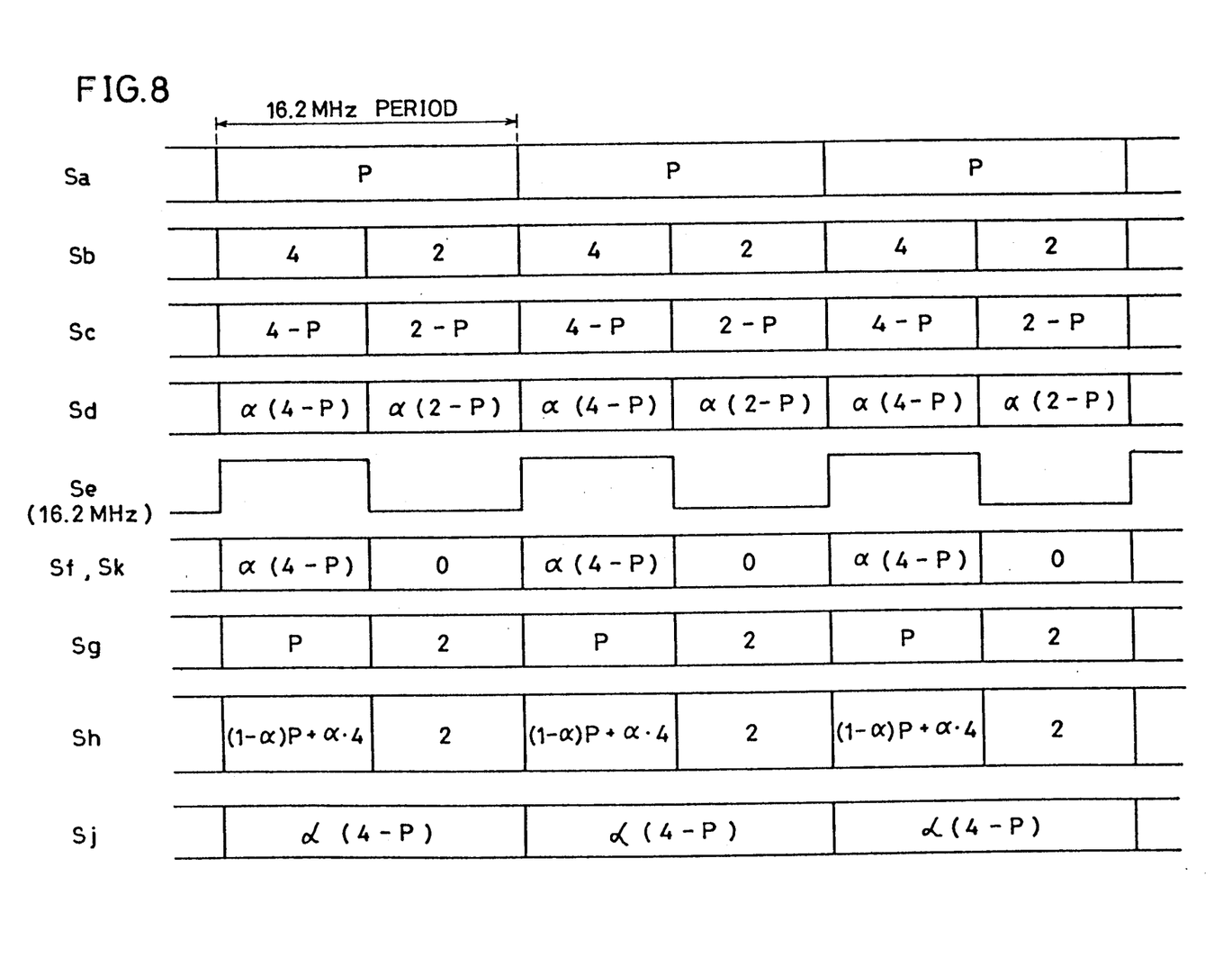
FIG. 8 is a signal processing diagram for describing an operation of the interframe interpolation circuit shown in FIG. 7.

A signal Sa shown in FIG. 8 is a subsampled video signal in the present field to be inputted. An output signal Sb of the frame memory 26 (one frame delay means) is such that subsampled video signals 4 four fields before, subjected to the noise reduction, are interframe interpolated between subsampled video signals 2 two fields before, subjected to the noise reduction. A subtracter 44 outputs a difference signal Sc between the signals Sa and Sb. That is, the signal Sc comprises an interframe difference signal 4-P, which is a difference between a subsampled video signal P in the present field and the subsampled video signal 4 four fields before, and a signal 2-P, which is a difference between the subsampled video signal P in the present field and the subsampled video signal 2 two fields before. An ROM 40 constituting a multiplier multiplies this output signal Sc by a coefficient $\alpha$ to output a noise reduction signal Sd. The switch S4 receives the output signal Sd of the ROM 40, i.e, a signal $\alpha$ (2-P) and a signal $\alpha$ (4-P) and thus selectively outputs the noise reduction signal $\alpha$ (4-P) which is the result of multiplying the interframe difference signal (4-P) by the coefficient $\alpha$, in response to a subsampling clock signal Se. Therefore, the switch S4 outputs a signal Sf.

The adder 42 adds the output signal Sg from the switch S1 to the output signal Sf from the switch S4, so that the subsampled video signal in the present field undergoes the noise reduction processing. Therefore, the noise-reduced output signal Sh of the adder 42 includes a signal $(1-\alpha)$ $P+\alpha\cdot 4$ in the present field, noise reduced, and the signal 2 two fields before, which appear alternately.

The noise reduction signal delay circuit 50 is connected to receive the signal Sd. A latch circuit 52 receives the noise reduction signal Sd from the ROM 40 and thus latches the signal $\alpha(4-P)$ in response to the subsampling clock Se. One pixel delay element 54 is connected to an output of the latch circuit 52. One-horizontal scanning period delay circuits 56a and 56b are connected to an output of the delay element 54.

Generally, the noise reduction signal indicates noise signal components, and the level thereof is lower than that of the subsampled video signal. Thus, as shown in FIG. 1, when the subsampled video signal Sa is 8-bit data, for example, the noise reduction signal Sd need not be more than 4-bit data. The noise reduction signal delay circuit 50 causes the latch circuit 52 to select only the noise reduction signal $\alpha$ (4-P) based on an interframe difference, so that only the signal $\alpha$ (4-P) is delayed. Therefore, it is noted that this noise reduction signal delay circuit 50 requires a smaller memory capacity.

The variable delay circuit (VDL) 59 for timing control, i.e, delay time control for several pixels is connected to an output of the intrafield interpolation circuit 18′. The adder 60 adds a delayed output signal from the intrafield interpolation circuit 18′ and the noise reduction signal to carry out the noise reduction processing for the subsampled video signal in the present field. The switch S5 connected to an output of the delay circuit 50 operates responsive to the subsampling clock Se. This switch S5 outputs a 0 noise reduction signal when the subsampled video signal two fields before is inputted, while it outputs the signal which is not noise-reduced in the present field when the not noise-reduced signal is inputted. That is, the adder 60 carries out the noise reduction processing for only the subsampled video signal in the present field but not for the subsampled video signal two fields before.

The intrafield interpolation circuit 18′ is connected to receive the input signal Sg of the adder 42 for the noise reduction. Therefore, the intrafield interpolation circuit 18′ receives the present field subsampled video signal which is not subjected to the noise reduction and the subsampled video signal two fields before. These signals are applied to the variable delay circuit 59 via the 1H delay circuits 24a and 24b. An output signal from the variable delay circuit 59 is applied to the adder 60. The adder 60 adds a noise reduction signal to the present field subsampled video signal included in the output signal of the intrafield interpolation circuit 18′ to carry out the noise reduction processing.

Figure 9:
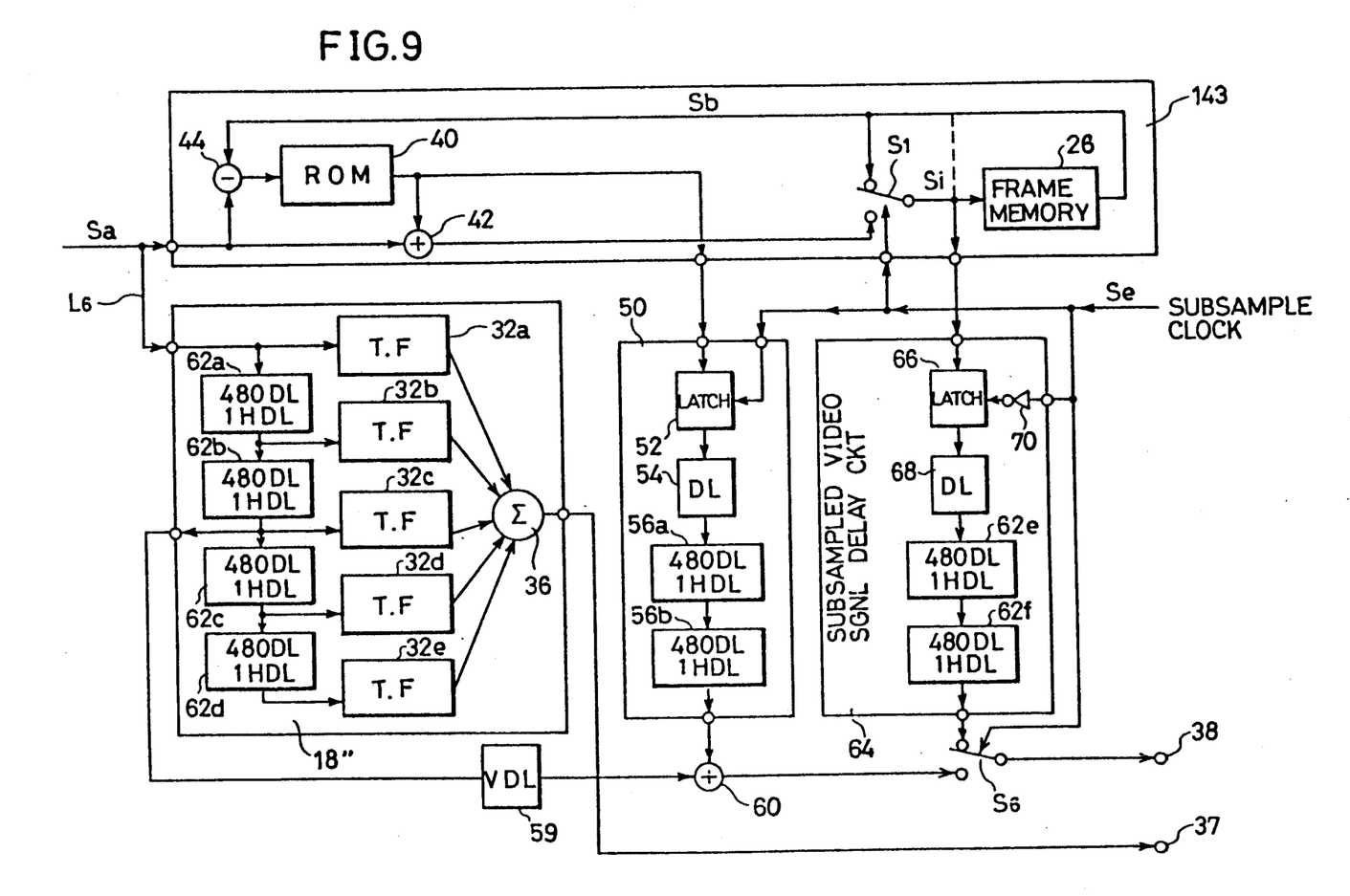
FIG. 9 is a block diagram of an interframe interpolation circuit showing a second embodiment of the present invention.

FIG. 9 shows the second embodiment of the present invention. In this embodiment, an intrafield interpolation circuit 18″, is connected to directly receive the subsampled video signal Sa in the present field. The intrafield interpolation circuit 18″ comprises one-horizontal scanning period (1H) delay circuits 62a–62d constituted by line memories. Since these delay circuits 62a–62d require half the sampling rate (16.2 MHz) of a signal to be delayed compared to the delay circuits 24a–24d of FIG. 1, the capacity of the line memories is reduced half. The noise reduction delay circuit 50 is connected to receive an output signal from the ROM 40.

A delay circuit 64 for the subsampled video signal two fields before comprises a latch circuit 66 for latching the subsampled video signal two fields before, one pixel delay element 68 comprising a latch circuit, and one-horizontal scanning period delay circuits 62e and 62f. The subsampling clock Se is applied to the latch circuit 66 via an inverter 70. The adder 60 adds the present field subsampled video signal and the noise reduction signal to carry out the noise reduction processing for the present field subsampled video signal. The switch S6 for interframe interpolation interpolates the noise-reduced subsampled video signal two fields before from the delay circuit 64 between the noise-reduced subsampled video signals in the present field in response to the subsampling clock Se.

In this embodiment, the present field subsampled video signal is applied to the intrafield interpolation circuit 18″. This present field subsampled video signal is noise-reduced by the adder 60 after two horizontal scanning periods delayed by the delay circuits 62a and 62b provided in the intrafield interpolation circuit 18″. In the subsampled video signal delay circuit 64, only the subsampled video signal two fields before is latched by the latch circuit 66 and is delayed by two horizontal scanning periods. The switch S6 interpolates the subsampled video signal two fields before from the delay circuit 64 between the noise-reduced subsampled video signals in the present field from the adder 60.

The third embodiment of the present invention will be described with reference to FIG. 10. It is first noted that the switches S1 and S4 provided in an interframe interpolation circuit 144 operate responsive to not only the subsampling clock signal Se but also a dropout signal DA. That is, an AND gate 74 is connected to receive the clock signal Se and the dropout signal DA, and the switches S1 and S4 are controlled responsive to an output signal of the AND gate 74.

In general, when a signal reproduced drops out in a reproducing apparatus such as a video tape recorder (VTR) or a video disk, the dropout is detected by a detection circuit and thus the dropout signal DA is generated. This dropout signal DA is applied to the AND gate 74 via a terminal 72. The dropout occurs when the dropout signal DA is applied. Therefore, the switches S1 and S4 are forcedly connected to their terminals b while the dropout is occurring. Consequently, a dropout compensation is carried out at a signal two frames before in place of the signal in the present field. That is, since the present field signal is unreliable, when the dropout occurs, the signal two frames before is forcedly used by the switch S1 for interpolation. In addition, when the dropout occurs, the value of the noise reduction signal is set to 0 by the switch S4, so that the set signal is applied to the noise reduction signal delay circuit 50. This prevents an unreliable noise reduction signal from being added by the adder 60.

Figure 10:
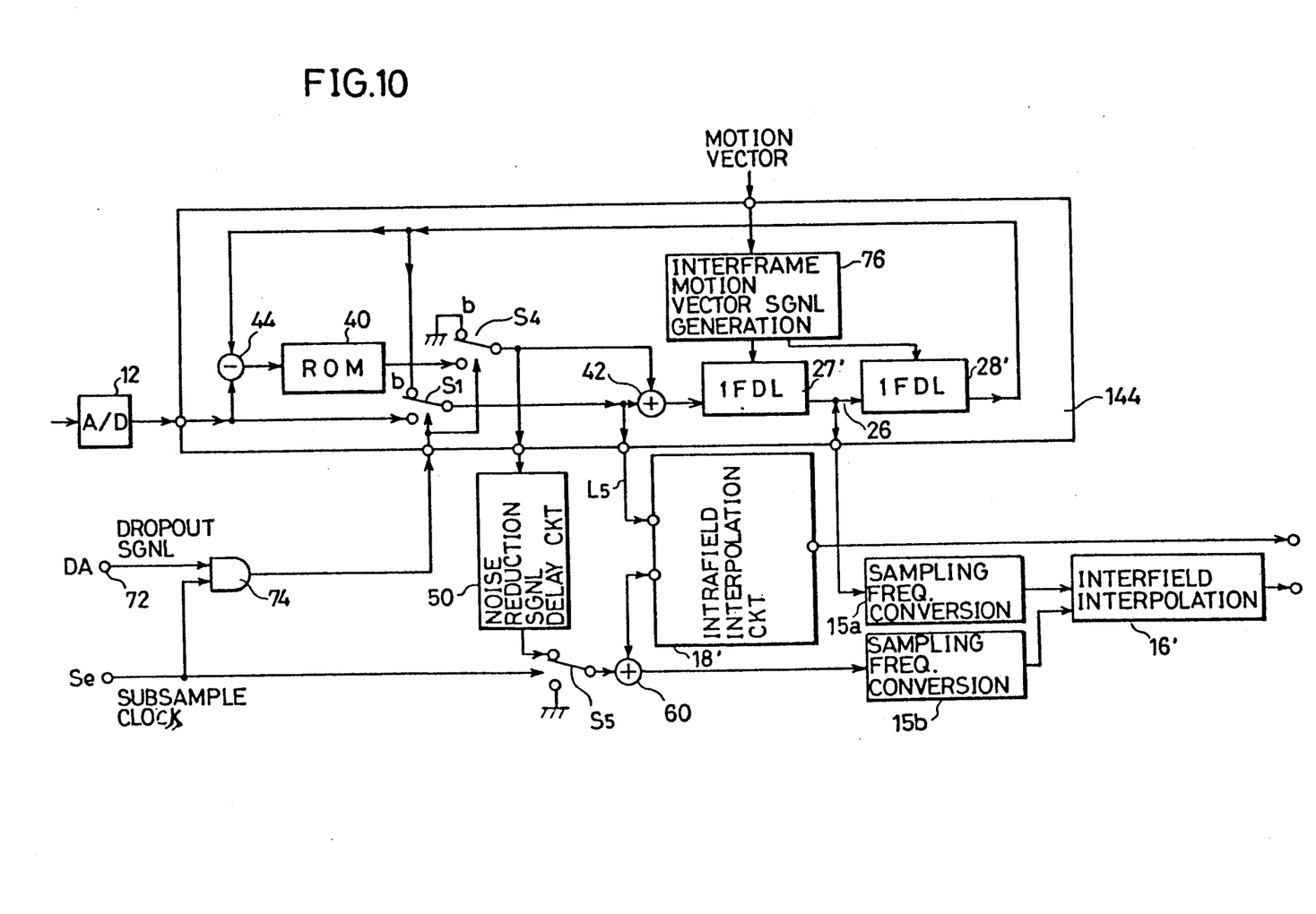
FIG. 10 is a block diagram of an interframe interpolation circuit showing a third embodiment of the present invention.
Figure 11A:
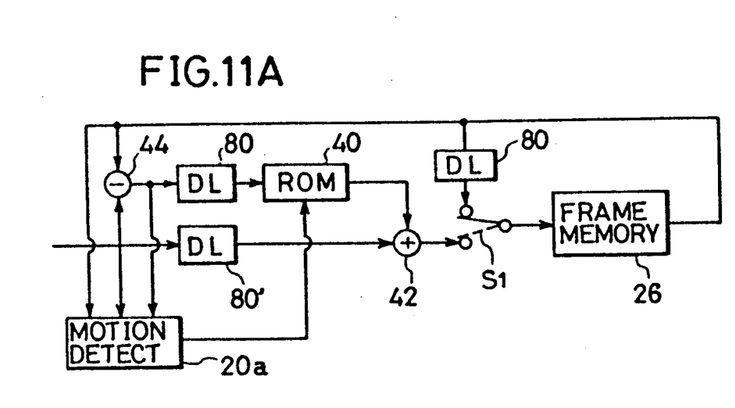
FIGS. 11A-11D are block diagrams showing examples of a control of a ROM provided in an interframe interpolation circuit.
Figure 11B:
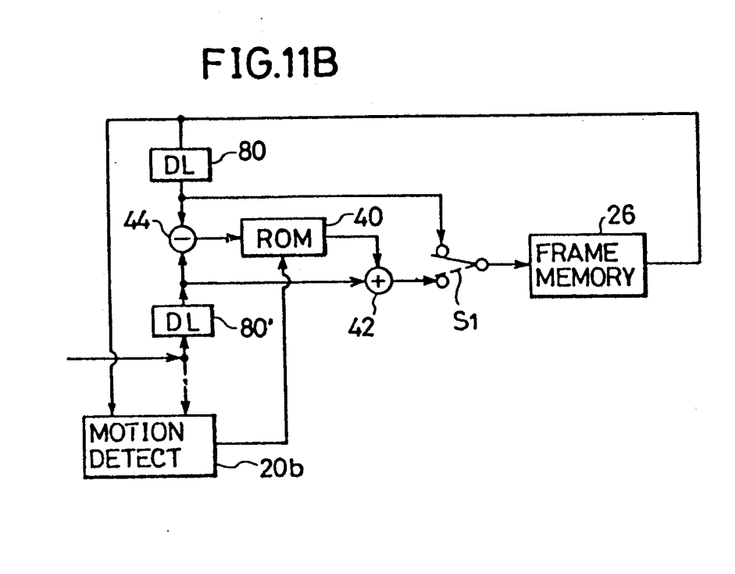
Figure 11C:
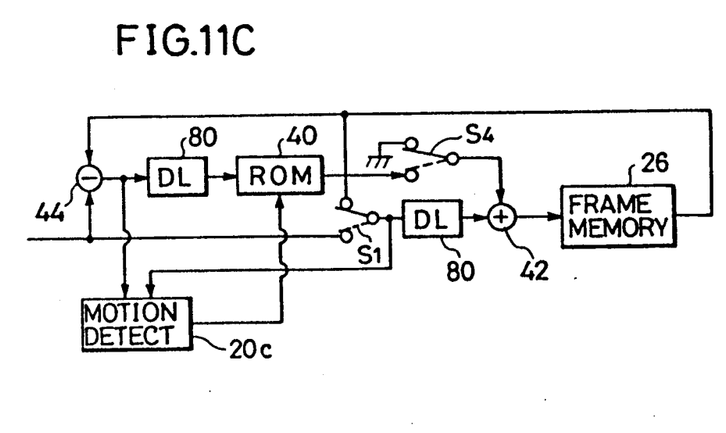
Figure 11D:
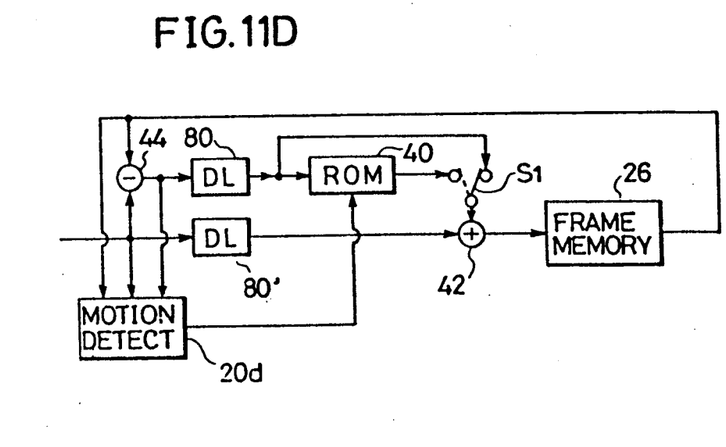

Next, it is also noted that the length of delay time of one-field delay circuits 27' and 28' constituting a one-frame delay circuit is controlled responsive to motion vector in the interframe interpolation circuit 144 shown in FIG. 10. Namely, an interfield motion vector signal generating circuit 76 is provided so as to generate two interfield motion vector signals for the present field and for the previous field in response to an interframe motion vector signal included in a control signal. Delay time of the delay circuits 27' and 28' is controlled responsive to the interfield motion vector signals generated. Consequently, it becomes possible to handle a motion picture, which is generated and shifts in one direction in panning a camera, as if it was a still picture, and thus the noise reduction processing becomes possible not only for the still picture but also the motion picture.

Furthermore, it is also noted that a field memory is not necessary in an interfield interpolation circuit 16' since a required signal is outputted from a connection node 26 between the delay circuits 27' and 28' in order to obtain a difference of one-field delay. However, two sampling frequency converting circuits 15a and 15b are required.

While the coefficient α of the ROM 40 as a multiplier is controlled by an SN ratio of a video signal inputted, it can also be controlled responsive to scene change or motion detection. When the motion detection circuit detects a larger motion, the coefficient α is selected smaller, resulting in the processing of a larger number of the pixel signals in the present field. Figs. 11A-11D show four examples of a control by motion detection circuits 20a-20d, respectively. It is noted in each example that a smaller number of delay lines (DL) 80 and 80' are preferable.

As has been described, since the pixel signals which are not noise-reduced are applied to the intrafield interpolation circuits 18' and 18" through a signal line L5 or L6, it is possible to employ the delay circuits 24a, 24b, 62a and 62b for still picture processing without exerting an adverse influence on the motion picture. In other words, a degradation in picture quality of the motion picture, resulting from the interframe interpolation processing, is prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An interframe interpolation device for a pixel signal sampled in accordance with interframe offset subsampling and employing first delay means (24a, 24b, 62a, 62b) for motion picture processing, comprising:
   holding means (26) for holding the pixel signal during two frames period;
   first interpolation means (S1) connected to receive said sampled pixel signal for interpolating a pixel signal in a previous frame, held by said holding means, between pixel signals in the present frame;
   first noise reduction means (40, 42, 44) connected to receive said sampled pixel signal for noise-reducing the pixel signal in the present frame in response to the present frame pixel signal and the pixel signal two frames before held;
   applying means (L5, L6) for applying a pixel signal which is not processed by said first noise reduction means to said first delay means; and
   second noise reduction means (40, 44, 60) connected to an output of said first delay means for noise-reducing a pixel signal delayed in response to the present frame pixel signal and the pixel signal two frames before held.

2. The interframe interpolation device in accordance with claim 1, wherein
   said first noise reduction means is connected to an output of said first interpolation means; and
   said applying means comprises first connection means (L5) for connecting the output of said first interpolation means and said first delay means.

3. The interframe interpolation device in accordance with claim 1, wherein
   said interframe interpolation device receives said sampled pixel signal in response to a predetermined sampling clock signal; wherein
   said first interpolation means comprises first switching means (S1) responsive to said sampling clock signal for selectively outputting the present frame pixel signal and the previous frame pixel signal held by said holding means.

4. The interframe interpolation device in accordance with claim 1, wherein
   said holding means has the length of time of holding the pixel signal varied responsive to a motion vector signal.

5. The interframe interpolation device in accordance with claim 1, wherein
   said motion picture processing comprises intrafield interpolation processing; and
   said first delay means comprises line memory means for intrafield interpolation processing.

6. The interframe interpolation device in accordance with claim 1, wherein
   said pixel signal sampled in accordance with said interframe offset subsampling comprises a pixel signal sampled in accordance with Multiple Subnyquist Sampling Encoding (MUSE).

7. The interframe interpolation device in accordance with claim 1, wherein
   said first interpolation means is connected to an output of said first noise reduction means; and said applying means comprises second connection means (L6) for connecting an input of said first noise reduction means and said first delaying means.

8. The interframe interpolation device in accordance with claim 7, further comprising:
second interpolation means (S6) connected to said holding means for interpolating the previous frame pixel signal held by said holding means into an output signal of said second noise reduction means.

9. The interframe interpolation device in accordance with claim 1, further comprising means (72) for receiving an abnormal signal indicating abnormality of said sampled pixel signal; wherein
said first interpolation means further operates responsive to the abnormal signal.

10. The interframe interpolation device in accordance with claim 9, wherein
said abnormal signal comprises a dropout signal indicating dropout of said sampled pixel signal.

11. The interframe interpolation device in accordance with claim 1, wherein said first noise reduction means comprises
difference detection means (44) for detecting a difference between the present frame pixel signal and the pixel signal two frames before held,
noise reduction signal generating means (40) responsive to an output signal from said difference detection means for generating a noise reduction signal for noise reduction,
first addition means (42) connected to receive said sampled pixel signal for adding the noise reduction signal generated to the present frame pixel signal; and
said holding means is connected to receive an output signal of said first addition means.

12. The interframe interpolation device in accordance with claim 11, wherein
said noise reduction signal generating means comprises multiplication means (40) responsive to a difference signal outputted from said difference detection means for multiplying the difference signal by a predetermined coefficient.

13. The interframe interpolation device in accordance with claim 11, wherein said second noise reduction means comprises
timing control means (54, 56a, 56b, 59) for timing controlling the noise reduction signal generated by said noise reduction signal generating means so as to be in synchronization with the output of said first delay means, and
second addition means (60) connected to receive an output signal of said first delay means for adding the noise reduction signal controlled by said timing control means to the output signal of said first delay means.

14. The interframe interpolation device in accordance with claim 13, wherein said timing control means comprises
second delay means (54, 56a, 56b) connected between said noise reduction signal generating means and said second addition means, and
third delay means (59) connected between said first delay means and said second addition means,
delay time of each of said second and third delay means being set to be adapted to time delayed by said motion picture processing.

15. A MUSE decoder for a pixel signal sampled in accordance with Multiple Sub-nyquist Sampling Encoding (MUSE), comprising:
interframe interpolation means for interpolating a pixel signal in a previous frame between pixel signals in the present frame; and
intrafield interpolation means (18') responsive to a pixel signal in the present field for interpolating a pixel signal between the pixel signals in the present field, said intrafield interpolation means comprising delay means (24a, 24b, 62a, 62b) for intrafield interpolation; wherein
said interframe interpolation means employs said delay means and comprises:
holding means (26) for holding the pixel signal during two frames period,
interpolation means (S1) connected to receive said sampled pixel signal for interpolating a previous frame pixel signal held by said holding means between the present frame pixel signals,
first noise reduction means (40, 42, 44) connected to receive said sampled pixel signal for noise-reducing the present frame pixel signal in response to the present frame pixel signal and the pixel signal two frames before held,
applying means (L5, L6) for applying a pixel signal which is not processed by said first noise reduction means to said delay means, and
second noise reduction means (40, 44, 60) connected to an output of said delay means for noise-reducing the pixel signal delayed in response to the present frame pixel signal and the pixel signal two frames before held.

* * * * *